United States Patent [19]

Morell et al.

[11] 4,017,966
[45] Apr. 19, 1977

[54] METHOD OF MANUFACTURING A MAGNETIC HEAD HAVING A RELATIVELY LARGE AIR-GAP AND A GOOD RESISTANCE TO MECHANICAL WEAR

[75] Inventors: Antoinette Morell; Jean Nicolas, both of Paris, France

[73] Assignee: Thomson-CSF, Paris, France

[22] Filed: Aug. 22, 1975

[21] Appl. No.: 607,019

[30] Foreign Application Priority Data

Sept. 6, 1974   France .............................. 74.30336

[52] U.S. Cl. .................................. 29/603; 360/120
[51] Int. Cl.² .................................................. G11B 5/42
[58] Field of Search ............. 29/603; 360/119, 120, 360/121

[56] References Cited

UNITED STATES PATENTS

| | | | |
|---|---|---|---|
| 3,145,452 | 8/1964 | Camras | 29/603 |
| 3,188,400 | 6/1965 | Vilensky | 29/603 |
| 3,411,202 | 11/1968 | Schwartz | 29/603 |
| 3,639,701 | 2/1972 | Secrist et al. | 29/603 |

*Primary Examiner*—Carl E. Hall
*Attorney, Agent, or Firm*—Oblon, Fisher, Spivak, McClelland & Maier

[57] ABSTRACT

A method of manufacturing a magnetic head, with a relatively large gap for reading, for instance, magnetic cards, and having a good resistance to mechanical wear, is provided. The head comprises two members with flat and parallel faces, made of a spinel ferrite having a high Curie temperature, encompassing a layer of non magnetic ferrite, 10 to 50 micrometers in thickness, deposited by silk-screen printing on one or both of the mutually opposite flat faces. The assembly is then bonded by sintering under pressure.

2 Claims, 8 Drawing Figures

METHOD OF MANUFACTURING A MAGNETIC HEAD HAVING A RELATIVELY LARGE AIR-GAP AND A GOOD RESISTANCE TO MECHANICAL WEAR

The present invention relates to a method of manufacturing magnetic recording, pick-up and erase heads for stores of the kind utilizing a moving data carrier.

The desired object is to achieve a magnetic head which is capable of being mass-produced with a very high degree of uniformity, and which also has good resistance to mechanical wear. The moving data carrier responsible for causing this wear, may for example be a magnetic tape. The invention is concerned in particular with current applications in which the magnetic head is in contact with a tape or band comprising a magnetic layer deposited upon a substrate, which latter is for example a ticket or a magnetic card. In applications of this kind, the magnetic layer (or a protective layer) is fully in contact with the head, giving rise to consequent very rapid wear and limiting the service life of the head to a few days, sometimes just a few hours.

Those skilled in the art will be aware of methods which consist in forming the gap playing the role of an air-gap by applying, one against the other, two blocks of magnetic ferrite, the mutually opposite faces of which carry a non-magnetic ferrite deposit previously produced by cathode-sputtering, the bond being achieved by a hot-pressing operation. However, the result which is obtained is a gap in the order of 1 micron in width, whereas in the aforesaid applications, a gap is sought which has a thickness of around 10 to 50 microns.

The invention makes it possible to achieve the desired objective for gaps of this order of magnitude.

In accordance with the invention, there is provided a method of manufacturing a magnetic head for operating stores utilizing a moving data carrier, said head comprising a magnetic circuit incorporating two sections of magnetic ferrite, each of them exhibiting at least one flat face, and a gap, playing the role of an air-gap, consisting of a non-magnetic ferrite layer arranged between said flat faces, said method comprising at least the following operations:

the deposition by silk-screen printing, on at least one of said flat faces, of a layer of the paste produced by mixing with a binder a ferrite powder the composition of which resembles the composition of said magnetic ferrite;
drying said layer to eliminate said binder; and
bonding said members at said flat faces by a sintering process carried out under pressure.

The invention will be better understood from a consideration of the description of an example of manufacture, illustrated by the following figures.

The non-limitative example chosen here, utilizes as magnetic material a spinel structure polycrystalline ferrite of overall chemical composition corresponding to the following formula:

$$Ni_{1-x} Zn_x Fe_{2(1-\epsilon)} O_4 \quad (1)$$

where $0 \leq x \leq 0.75$ and $-0.03 \leq \epsilon \leq +0.03$

The method of manufacturing the ferrite comprises the following steps:

First step

Mixing of zinc, nickel and iron oxides having a purity better than 99% is carried out in order to obtain a proportion between metallic and oxygen atoms, which is that indicated by the preceding formula, account being taken of the known firing losses which are encountered during the ensuing heat treatments; the mixture is crushed in steel vessels using steel balls and distilled water, for approximately 24 hours; and the crushed mixture is then dried.

Second step

The powder obtained from the first step is subjected to a firing operation (heat treatment at a temperature between 900 and 1100° C for several hours) and the product thus obtained is subjected to a new wet crushing operation followed by drying.

Third step

The powder obtained from the second step is pressed using a known method, to form discs around 60 mm in diameter and having a thickness of 15 to 20 mm.

Fourth step

The disc is placed in a known device for carrying out sintering under pressure, where it is processed as follows:
a progressive increase in temperature up to 1150° C;
application of a pressure of 500 kg/cm² for 1 hour, the temperature being maintained at the indicated value; and
relaxation of the pressure and very slow cooling.

The following step constitutes an example of the first operation of the method in accordance with the invention. It consists in cutting the disc into slices 5 mm thick which are ground in order to achieve a parallelism between the flat faces, of the order of around 10 microns.

The second operation of the method in accordance with the invention comprises the preparation of a non-magnetic ferrite for instance a zinc ferrite;

$$Zn Fe_2 O_4 \quad (2)$$

The method of preparing this material is similar to the process just described for the preparation of the magnetic ferrite, but is limited for example to the first two steps, this yielding material, in the form of a dry powder, which must be subjected to a later sintering operation during the course of subsequent operations, in order to form a non-magnetic polycrystalline ferrite.

During a third operation, silk-screen printing is used to deposit upon the flat face of a slice produced during the course of the first operation, a layer of the paste produced by mixing some of the non-magentic ferrite powder with a known binder of a kind employed in silk-screen printing.

Figure 1:
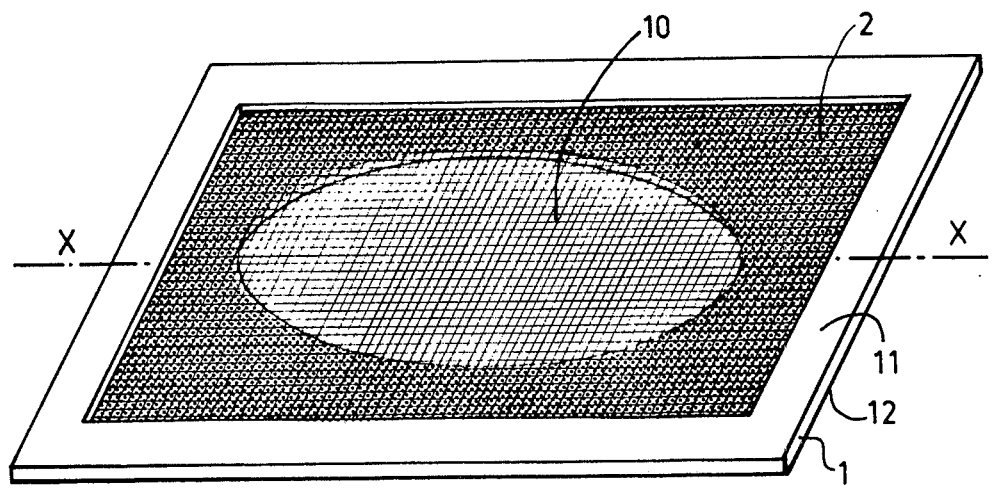
FIG. 1 illustrates a perspective view and FIG. 2 a section, of a silk-screen printing frame adapted to operate the method in accordance with the invention.
Figure 2:
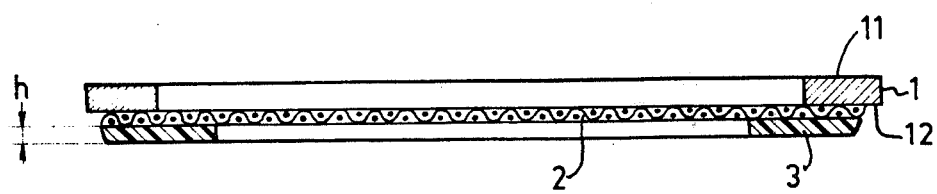

FIGS. 1 and 2 illustrate a silk-screen printing screen, adapted for the purposes of the invention. In the perspective view of FIG. 1, a metal frame 1 can be seen of rectangular form, to which the screen proper 2 is stuck, the screen being constituted by fine nylon filaments or stainless steel wires, forming meshes in the order of some few hundredths of a millimeter (the screen is referred to as being 100 to 400 mesh, or meshes per inch, according to a known system of classification).

Figure 3:
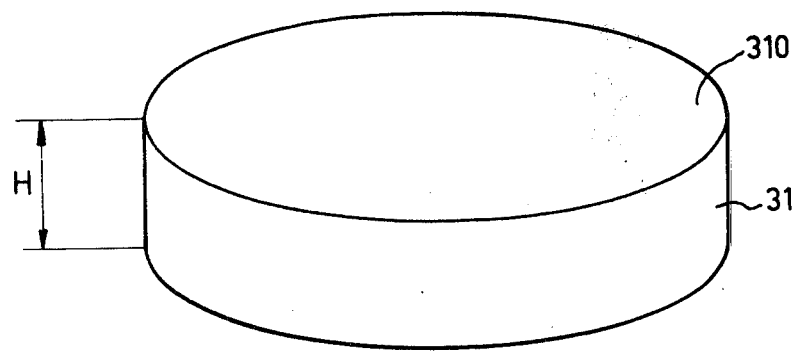
FIGS. 3 to 7 illustrate successive stages in the manufacture of a magnetic head, in accordance with the invention.

The screen 1 has two main faces 11 and 12. The face 12 or rear face is designed to be placed opposite a slice 31 of thickness H (shown in FIG. 3), coming from the first operation. The screen 2 is stuck to the face 12. On the free face of the screen, an emulsion 3 (FIG. 2) is deposited, which forms a solid layer of given thickness $h$ in the order of 20 to 100 microns. This layer has a dual function:

by the provision of a circular cut-out at its centre, it leaves free the central part 10 of the screen over an area identical to the section 310 of the slide 31; by contrast, it blocks the screen meshes which are located outside this area 10;

because of its presence and through the medium of certain elementary precautions carried out in performing the silk-screen printing operation, it determines the thickness of the deposited layer.

Silk-screen printing can be carried out manually using known tools, in particular with a scraper which makes it possible to transfer the paste across the meshes of the screen. Preferentially, a "silk-screen printing machine" will be used, of known type, on which the pressure and speed of the scraper can be adjusted. In this way, reproducible results are obtained which enable mass production to be carried out.

At the end of this third operation a drying of the layer deposited by silk-screen printing is carried out, in order to eliminate the binder for instance by evaporation in two phases:

preheating at 125° C for around 30 minutes;
heating to 600° C for around 12 to 24 hours.

During a fourth operation two pieces of ferrite are bonded by the sintering process carried out under pressure.

Figure 4:
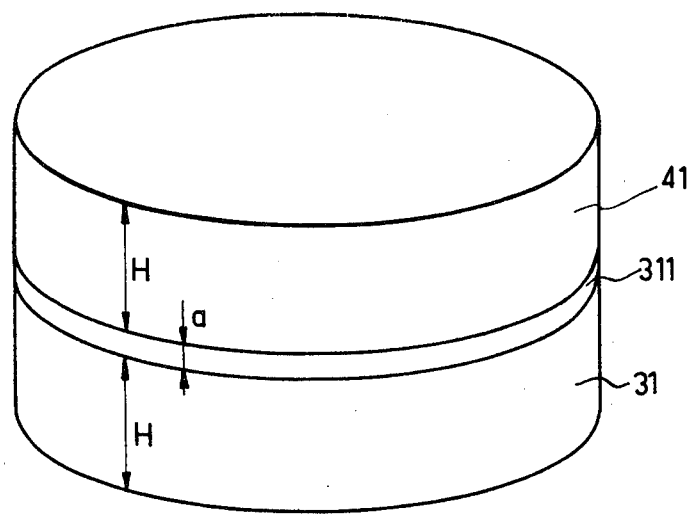

To this end, two ferrite slices are superimposed in such a fashion that they are separated by a silk-screen deposited layer. In FIG. 4, slices 31 and 41 (width H) of this kind have been shown separated by a layer 311 (width $a$).

The member thus obtained is subjected to a treatment similar to that of the fourth step described hereinbefore in the case of the magnetic ferrite. The pressures, temperatures and times of the various phases, are of the same order of magnitude.

The thickness of the silk-screen printed layer represents the length of the air gap in the final magnetic circuit. During the course of the drying and sintering operations, this layer, however, undergoes a thickness reduction of the order of one half. Consequently, the thickness of the deposited layer produced during the third operation, must be designed to take account of this fact so that the desired gap is ultimately achieved (10 to 50 microns). It is also possible to deposit a silk-screen printed layer on both the slices which are to be stuck together.

When sintering under pressure takes place, a solid-state diffusion mechanism takes place which results in mutual penetration of the atoms of the two materials and creates a perfect bond.

Figure 5:
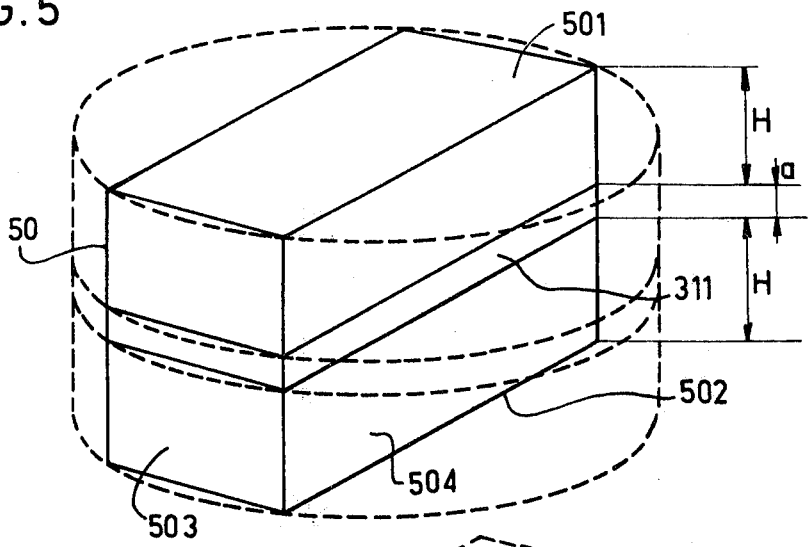

During a fifth operation, in two steps the members obtained after the fourth operation are machined. (FIG. 5)

First machining step by sawing each member, at least one bar 50 is obtained which is a rectangular parallepiped. The bar has two faces 501 and 502 which represent parts of flat faces of the member prior to machining. The other faces, such as the small face 503 and the large face 504, are split, at mid-height, by the layer 311. It should be pointed out that in the example chosen the material of the component 50 is of highly uniform appearance and the air gap can only be distinguished by having recourse, for example, to a magnetic powder which will render the same apparent. It is therefore of interest to retain part of the original faces in order to be able to locate the air gap at the interval H from each of the faces 501 and 502.

Second machining step

Figure 6:
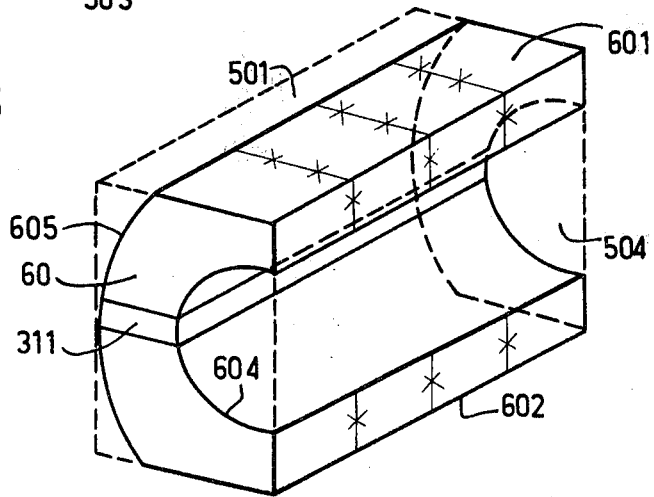

In FIG. 6, the block 60 is the remaining part of the bar 50 after the machining:

in the face 504, of a bore 604 produced for example by a drilling operation performed perpendicularly to the small face 503, the radius of curvature of the bore being less than H;

in the opposite large face, of a cylindrical surface 605 produced for example by grinding and having a radius of curvature greater than H.

The section of the block 60 in a planeparallel to its small faces, in U-shaped, the legs being located at either side of the layer 311.

By cutting the block 60 along planes perpendicular to the central plane of the air gap, a series of U-shaped components is obtained. In a sixth operation, the magnetic head is completed.

Figure 7:
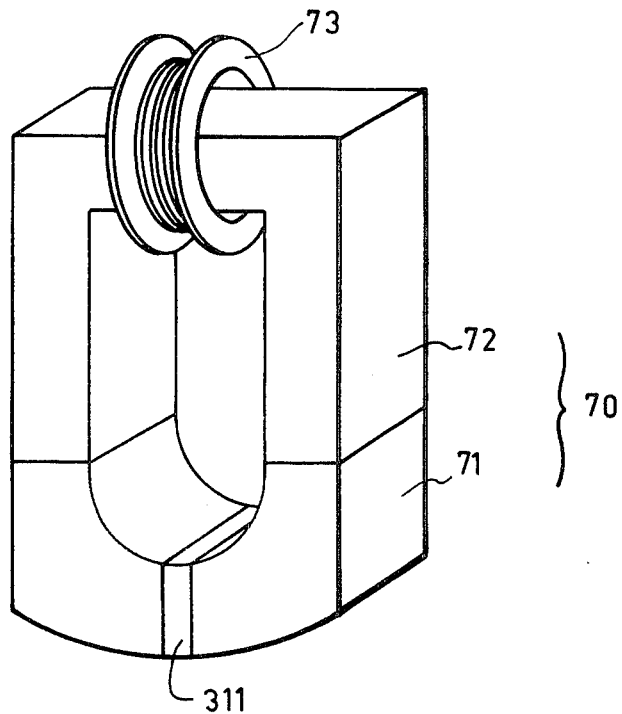

In FIG. 7, a magnetic head has been shown comprising a U-shaped component marked 71 which in association with a member 72 of magnetically soft material (pure metal, alloy or ferrite), constitutes a magnetic circuit 70 with an "air gap" 311. The members 71 and 72 are simply stuck together after the prior grinding operation, so that the additional "air gap" thus created is negligible compared with that 311.

The magnetic circuit 70 has at least one coil 73 which may for example be a pick-up winding.

Figure 8:
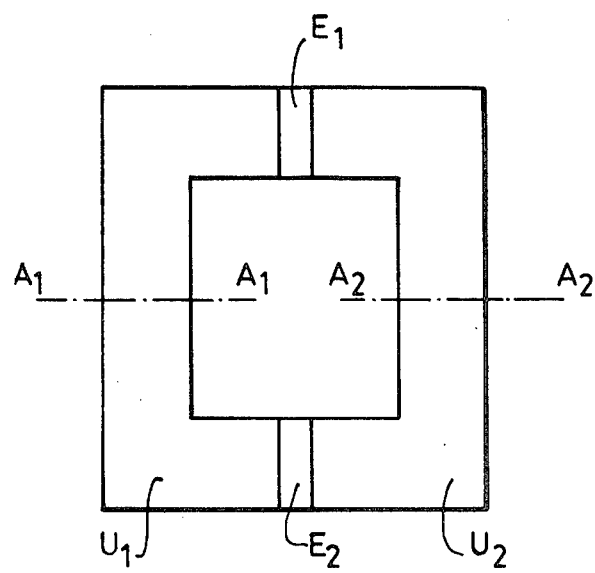
FIG. 8 illustrates a variant embodiment of one stage in said manufacture.

Numerous variant embodiments are possible without departing from the scope of the invention:

at the stage of preparation of the materials, it is possible to utilize materials of other formulae, respectively magnetic and non-magnetic materials, these latter being used to produce the layer which is deposited by silk-screen printing. In the situation where bonding by mutual diffusion of the material of which the layer is made and of the magnetic material, is not possible, a more conventional bonding technique will be used.
2. If a nickel and zinc ferrite is used for the magnetic material, then the relative proportions of these two metals can be modified whilst adhering to the ratio between the total number of nickel and zinc atoms, on the one hand, and the number of iron atoms or the number of oxygen atoms on the other, as specified in formula (1). In addition, the value of the parameter $\epsilon$ may vary to either side of $\epsilon = 0.01$. 3. During the third step it is possible to directly produce bars of the kind obtained in the example described during the first machining step. These bars will then be subjected to operations similar to those carried out upon the discs. 4. At the time of the second operation of the method in accordance with the invention, sintering can be carried out on the non-magnetic ferrite, the product obtained crushed, and then, the resultant powder used in the third operation (silk-screen deposition). 5. Finally, other cuts and modes of assembly of the magnetic ferrite components obtained, can be employed. For example, it is possible by a sawing operation to produce members $U_1$ and $U_2$ which are U-shaped, as schematically illustrated in FIG. 8 following their assembly with the inclusion of two gaps $E_1$ and $E_2$ formed in accordance with the method of the invention. The two gap magnetic circuit thus obtained is then sawed along the planes marked by the line $A_1A_1$ and $A_2A_2$ in order to give two U-shaped pieces with only with one gap, these being similar to the member 71 of figure 7.

What we claim:

1. A method of manufacturing a magnetic head assembly, including a U-shaped component consisting of a pair of magnetic ferrite sections, each of them having at least one flat face, and a gap, serving as an air-gap, consisting of a non-magnetic ferrite layer interposed between said flat faces, said method comprising the steps of:

cutting a disc of magnetic ferrite material into at least two slices having two large opposite faces and grinding them so as to achieve parallelism therebetween of the order of approximately 10 microns;

preparing a powder of zinc and iron oxides able to yield by sintering a non-magnetic ferrite, and mixing the same with a binder so as to form a paste;

depositing a layer of said paste by silk-screen printing on one face of at least one of said slices, and drying said layer so as to eliminate the binder;

bonding said two slices together, by sintering the same under pressure, for obtaining a composite member in which said layer in sandwiched between the two slices; and machining said composite member by a) cutting said member for obtaining at least one elongate bar which is a rectangular parallelepiped; b) drilling and grinding said bar in the longitudinal direction so as to obtain an elongate U-shaped block; and c) transversely cutting said block for obtaining a series of U-shaped components, one of which is to be used in said assembly.

2. A method as claimed in claim 1 wherein:

said magnetic ferrite material is a spinel structure polycrystalline ferrite in the composition of which there is Ni and Zn and in the manufacture of which there is a step of sintering under pressure; and said non-magnetic ferrite satisfies the formula $Zn Fe_2O_4$ and is a polycrystalline obtained by sintering under pressure in the course of said bonding operation.

* * * * *